(12) United States Patent
Bay et al.

(10) Patent No.: US 11,743,439 B2
(45) Date of Patent: *Aug. 29, 2023

(54) METHODS AND SYSTEMS FOR MANAGING CONTENT ITEMS

(71) Applicant: Comcast Cable Communications, LLC, Philadelphia, PA (US)

(72) Inventors: Douglas Bay, Castle Rock, CO (US); David Leach, Centennial, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/523,573

(22) Filed: Nov. 10, 2021

(65) Prior Publication Data

US 2022/0303517 A1    Sep. 22, 2022

Related U.S. Application Data

(63) Continuation of application No. 16/355,323, filed on Mar. 15, 2019, now Pat. No. 11,202,049.

(51) Int. Cl.
| | |
|---|---|
| *H04N 9/87* | (2006.01) |
| *H04N 9/825* | (2006.01) |
| *G11B 27/32* | (2006.01) |
| *H04N 7/18* | (2006.01) |
| *H04N 9/802* | (2006.01) |
| *G06V 20/52* | (2022.01) |

(52) U.S. Cl.
CPC ........... *H04N 9/8255* (2013.01); *G06V 20/52* (2022.01); *G11B 27/32* (2013.01); *H04N 7/181* (2013.01); *H04N 9/802* (2013.01); *H04N 9/87* (2013.01)

(58) Field of Classification Search
USPC ........................................................ 386/201
See application file for complete search history.

(56) References Cited

U.S. PATENT DOCUMENTS

| | | |
|---|---|---|
| 4,392,160 A | 7/1983 | Minemura |
| 4,725,894 A | 2/1988 | Sasaki et al. |
| 4,725,994 A | 2/1988 | Kaneko et al. |

(Continued)

FOREIGN PATENT DOCUMENTS

| | | |
|---|---|---|
| JP | S61245689 A | 10/1986 |
| WO | 2010043922 A1 | 4/2010 |

OTHER PUBLICATIONS

Office Action for European Patent Application No. 20163015.9 dated Mar. 3, 2022, 10 pgs.

*Primary Examiner* — Nigar Chowdhury
(74) *Attorney, Agent, or Firm* — Ballard Spahr LLP

(57) ABSTRACT

Methods and systems for managing content items are described. A content item may be separated into components, such as chroma components, luminance components, and audio components. For more efficient management of the content, including for storage and delivery of the content, the separate components may be stored at different locations. For example, chroma components may be stored on a central server, while luminance and audio components are stored at other locations, such as edge servers, or vice versa, to accommodate network efficiency considerations. When content is delivered to a player, two or more separate streams carrying different content components may be delivered to the player.

20 Claims, 8 Drawing Sheets

(56) References Cited

U.S. PATENT DOCUMENTS

| | | | |
|---|---|---|---|
| 4,779,143 A | 10/1988 | Oku et al. | |
| 5,542,032 A * | 7/1996 | Pritt | G06T 15/503 |
| | | | 345/419 |
| 5,684,511 A * | 11/1997 | Westerink | G11B 27/036 |
| | | | 345/157 |
| 5,758,013 A * | 5/1998 | Kizu | H04N 9/7925 |
| 6,507,872 B1 * | 1/2003 | Geshwind | H04L 69/161 |
| | | | 709/236 |
| 6,693,866 B1 | 2/2004 | Murata | |
| 2002/0032697 A1 * | 3/2002 | French | G06T 17/005 |
| | | | 715/211 |
| 2002/0057902 A1 * | 5/2002 | Song | H04N 19/60 |
| | | | 375/E7.211 |
| 2004/0146011 A1 | 7/2004 | Kesaniemi et al. | |
| 2007/0188514 A1 | 8/2007 | Li | |
| 2011/0145859 A1 | 6/2011 | Novack et al. | |
| 2011/0299411 A1 | 12/2011 | Chen et al. | |
| 2017/0047094 A1 | 2/2017 | Leppanen et al. | |
| 2017/0078718 A1 | 3/2017 | Ioffe | |
| 2017/0199979 A1 | 7/2017 | Reiner | |
| 2019/0069375 A1 | 2/2019 | Baker et al. | |
| 2019/0303684 A1 | 10/2019 | Khadloya et al. | |

* cited by examiner

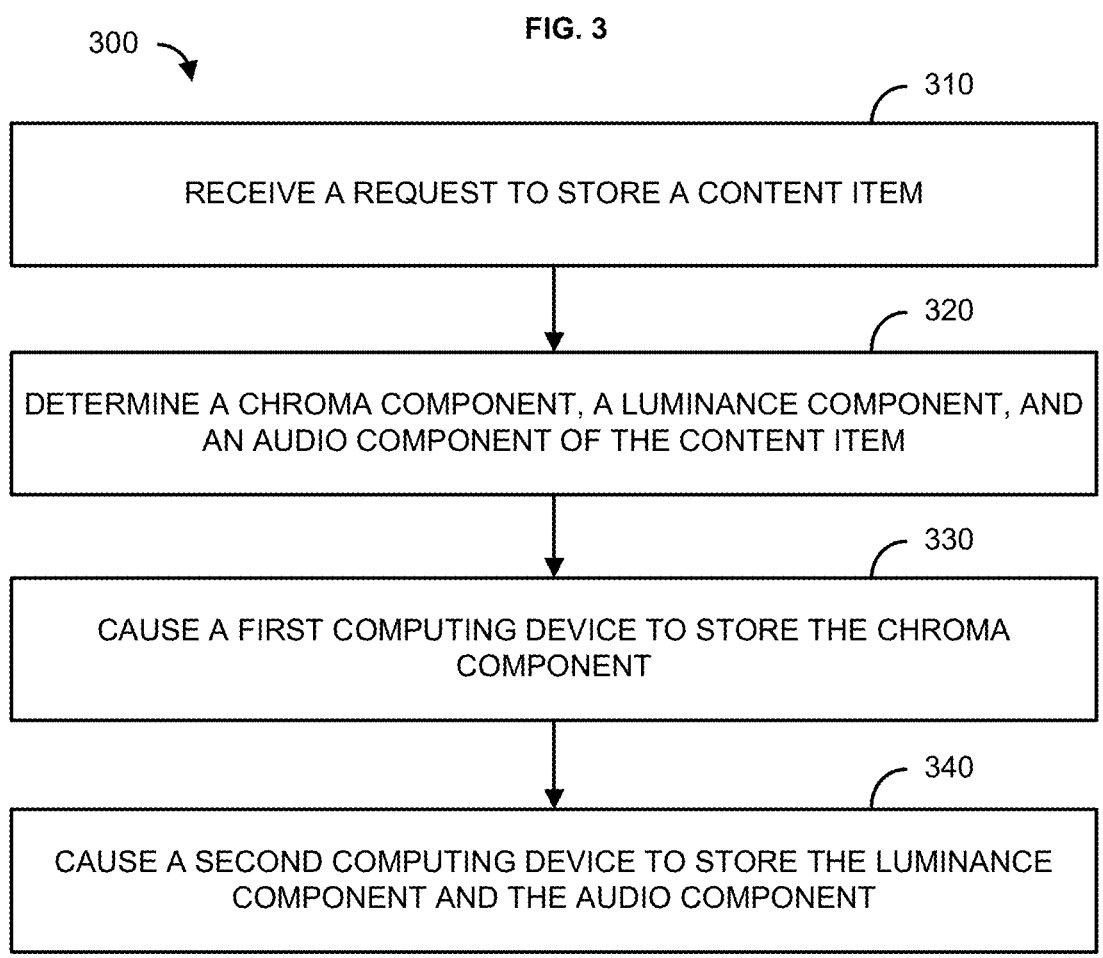

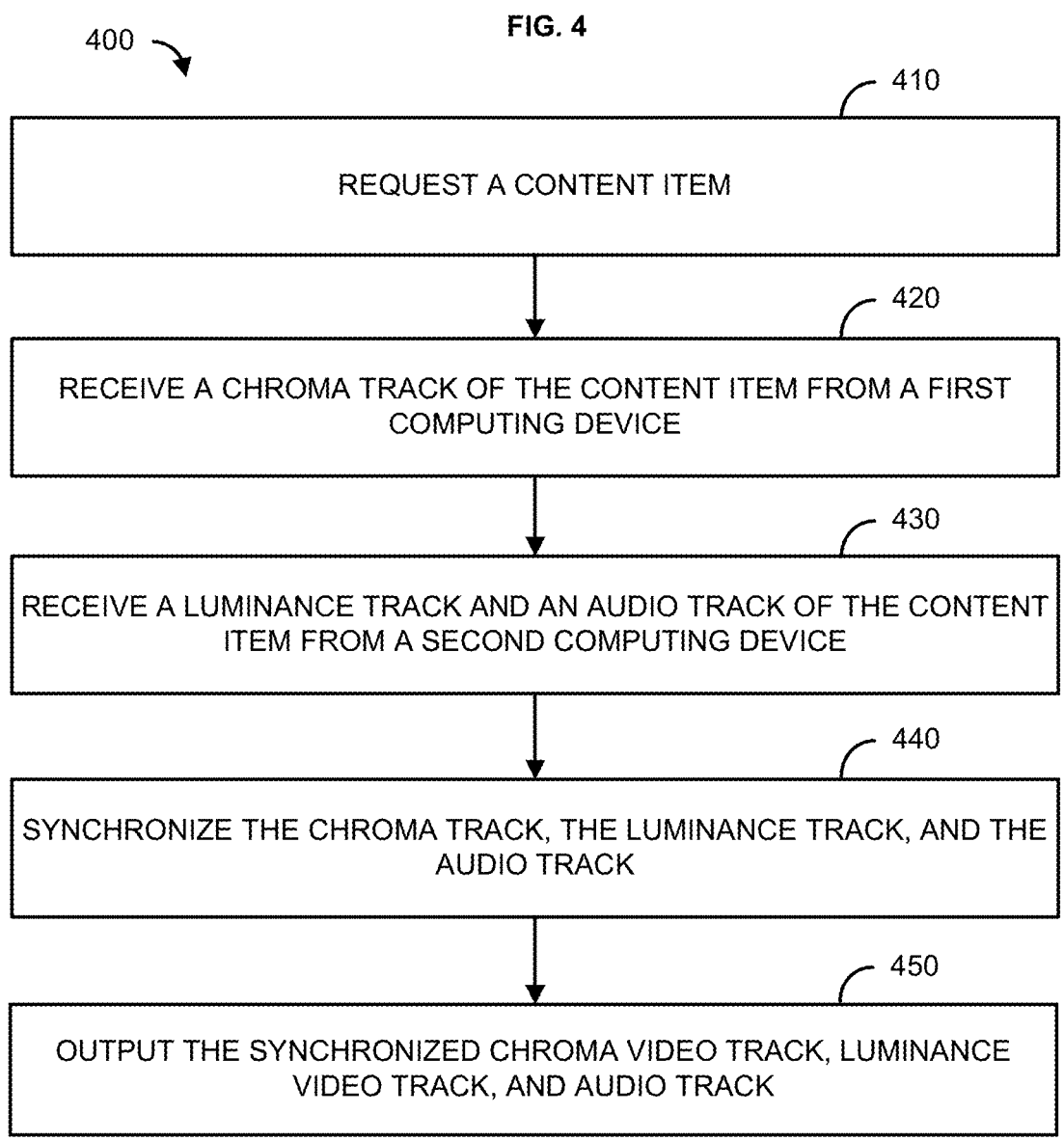

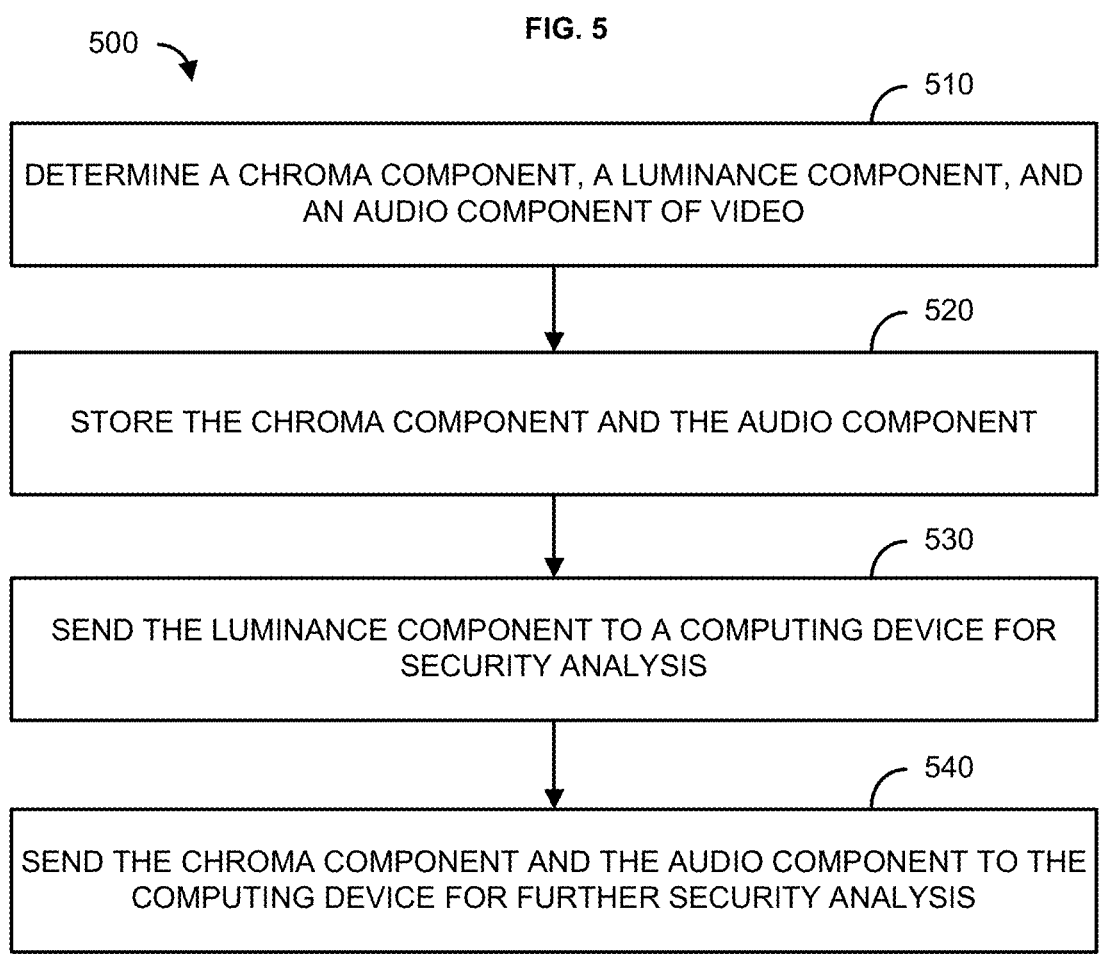

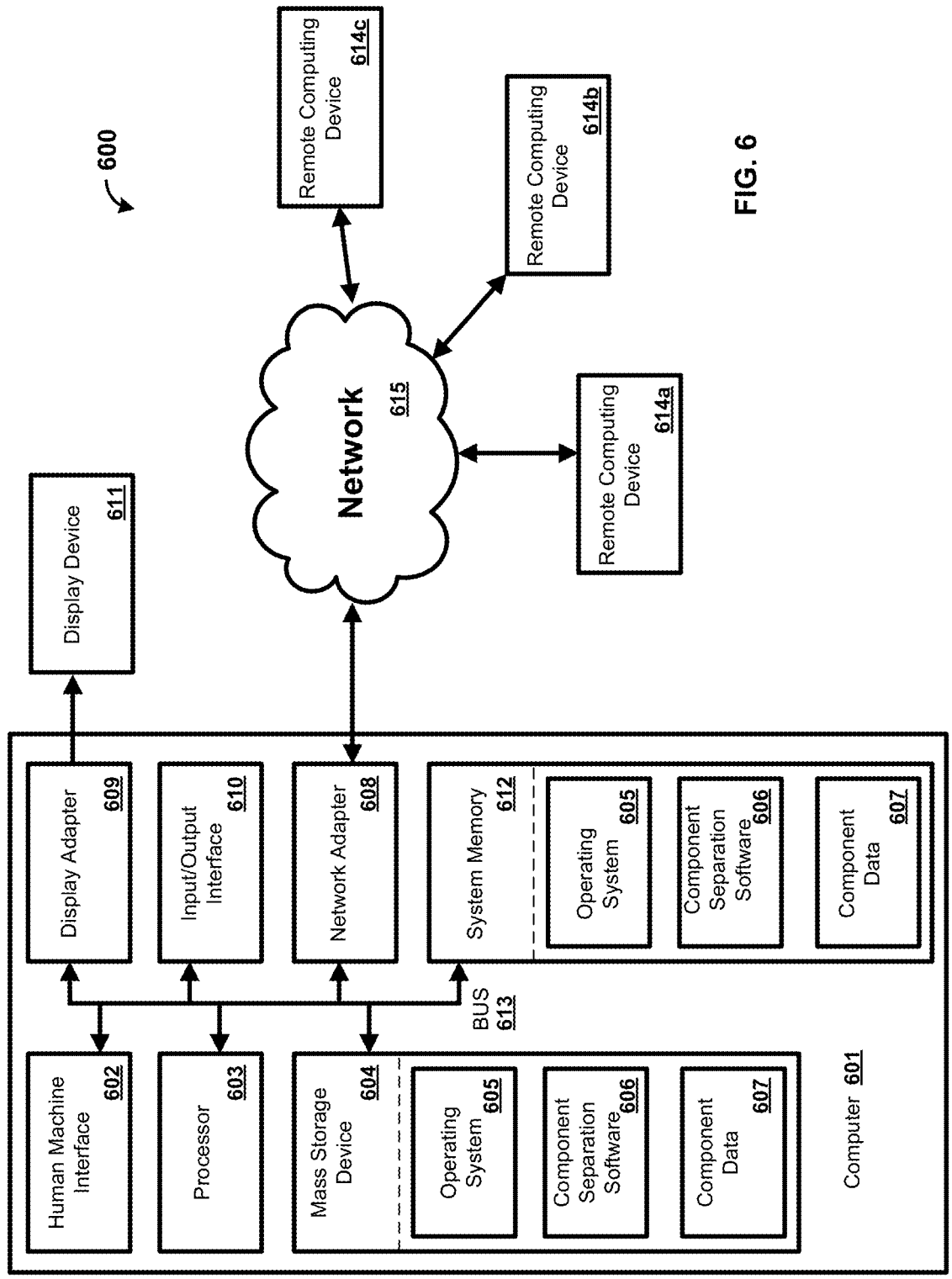

METHODS AND SYSTEMS FOR MANAGING CONTENT ITEMS

CROSS-REFERENCE TO RELATED APPLICATION

This application is a continuation of U.S. application Ser. No. 16/355,323, filed Mar. 15, 2019, which is herein incorporated by reference in its entirety.

BACKGROUND

Content, such as video content, is often redundantly stored and processed by multiple network devices. The quality of content when output by a user device (e.g., content player, set-top box, mobile device, digital video recorder, smart device, etc.) may be affected by propagation delays, errors introduced by a transmission medium, and/or the like based on how/where the content is stored and/or processed. Access and delivery of content redundantly stored and processed by multiple network devices requires significant storage and bandwidth resources.

SUMMARY

It is to be understood that both the following general description and the following detailed description are exemplary and explanatory only and are not restrictive. Methods and systems for managing content items are described. A content item (e.g., video asset, multimedia asset, etc.) may be separated into components to reduce storage and bandwidth requirements associated with access, storage, and delivery of the content item. The content item may be separated, decomposed, and/or filtered to a chroma component, a luminance component, and an audio component. The chroma component, associated with color portions of the content item, may represent a majority of data/information associated with the content item. The luminance component, associated with achromatic portions of the content item (e.g., brightness of an image, black and white color of an image, etc.), and the audio component, associated with acoustic portions, text portions, language portions, and/or the like of the content item, may represent less data/information associated with the content item than the chroma component. The chroma component, which may require more storage and bandwidth resources than the luminance and audio components, may be stored by a computing device (e.g., a central server, a cloud device, etc.). The luminance and audio components, which may require less storage and bandwidth resources than the chroma component of the content item, may be stored by an edge device (e.g., a computing device such as a server or network device, a memory component associated with a router, a gateway device, or an integrated access device (IAD), etc.). A user device (e.g., content player, set-top box, mobile device, digital video recorder, smart device, etc.) may request the content item and receive the chroma component from the computing device and the luminance and audio components from the edge device. The user device, or an intermediary device, may synchronize the chroma, the luminance, and the audio components to output the content item (e.g., composite content item). The separation/decomposition of content items (e.g., video assets, multimedia assets, etc.) into a chroma, luminance, and audio components to reduce storage and bandwidth requirements is also addressed with respect to video capture and security.

This summary is not intended to identify critical or essential features of the disclosure, but merely to summarize certain features and variations thereof. Other details and features will be described in the sections that follow.

BRIEF DESCRIPTION OF THE DRAWINGS

FIG. 3 shows a flowchart of a method for managing content items;
FIG. 4 shows a flowchart of a method for managing content items;
FIG. 5 shows a flowchart of a method for managing content items;
and
FIG. 6 shows a block diagram of a computing device for implementing management of content items.

DETAILED DESCRIPTION

Figure 1A:
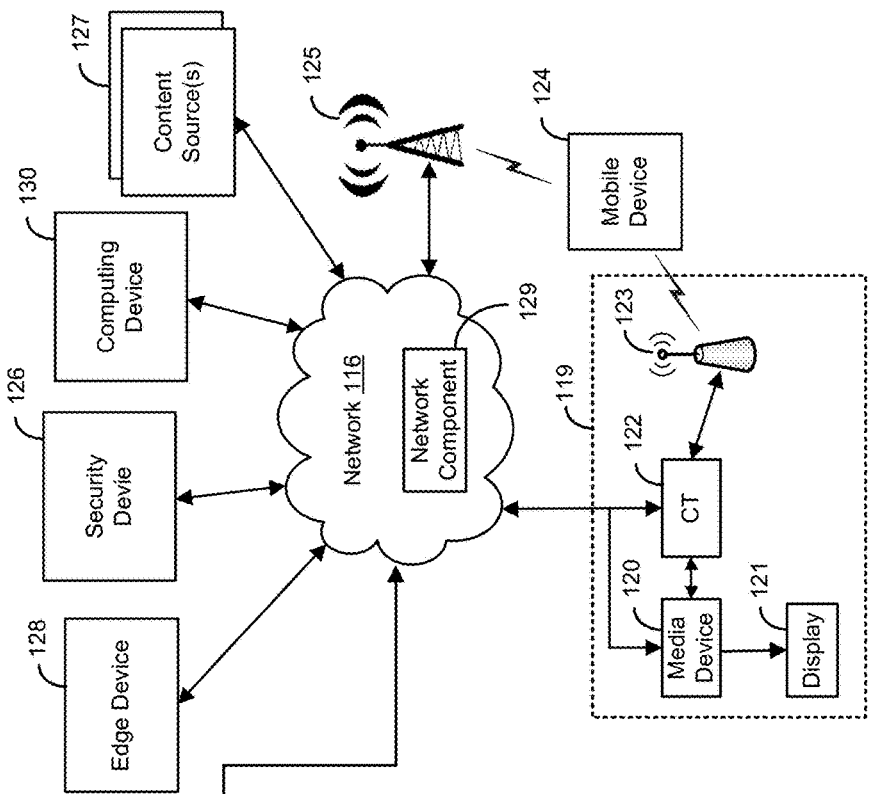
FIG. 1A shows a system for managing content items.
Figure 1A:
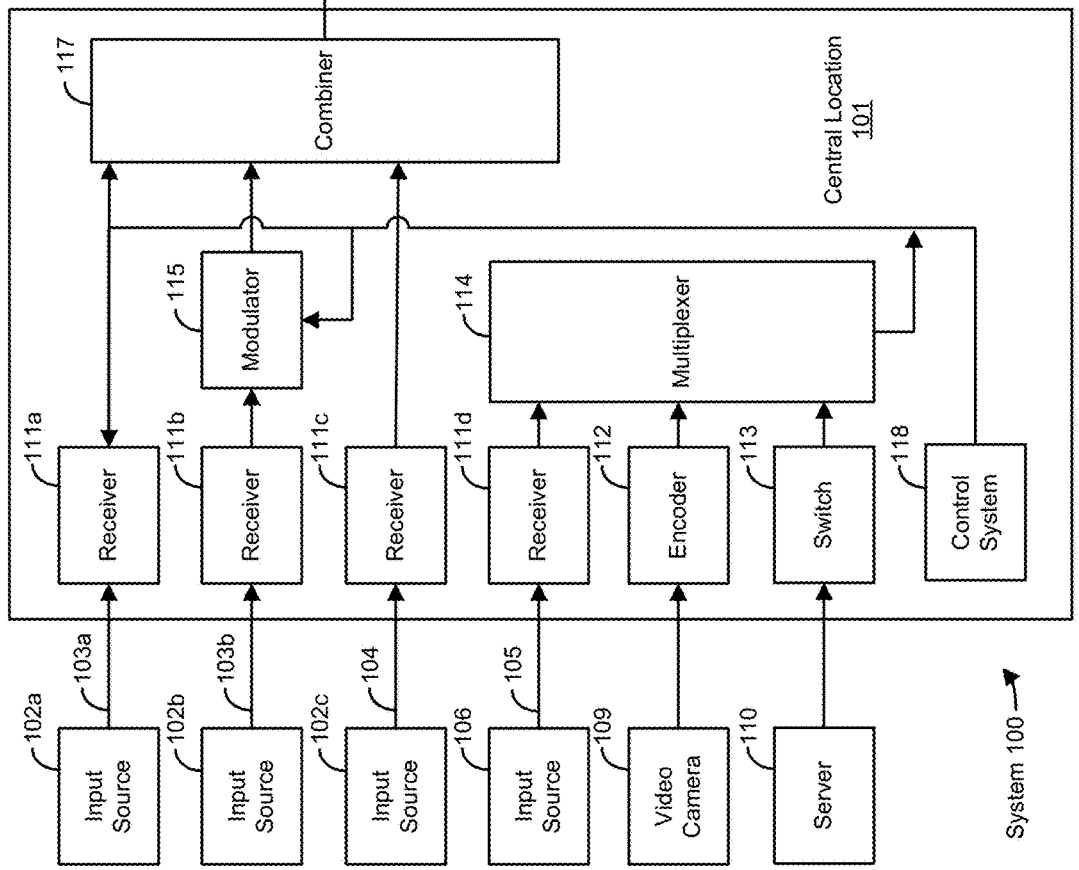

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information." Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

Phrases used herein, such as "accessing" content, "providing" content, "viewing" content, "listening" to content, "rendering" content, "playing" content, "consuming" content, and the like are considered interchangeable, related, and/or the same. In some cases, the particular term utilized may be dependent on the context in which it is used. Accessing video may also be referred to as viewing or playing the video. Accessing audio may also be referred to as listening to or playing the audio.

This detailed description may refer to a given entity performing some action. It should be understood that this language may in some cases mean that a system (e.g., a computer) owned and/or controlled by the given entity is actually performing the action.

A content item may be separated into components to reduce storage and bandwidth requirements associated with access/storage of content items. The content item may include a plurality of portions (e.g., frames, sections, data packets, etc.). Each portion of the plurality of portions may include a plurality of pixels, and each pixel of the plurality of pixels may include a chroma component (e.g., chroma data, chrominance information, color information, etc.) and a luminance component (e.g., luminance data, luma information, brightness information, etc.). Each portion of the plurality of portions may include audio components, such as acoustic information (e.g., frequency information, wavelength information, bass information, treble information, etc.), language (e.g., English, French, Italian, etc.) information, closed caption information, metadata, etc.). The content item may be separated and/or filtered based on the chroma component, the luminance component, and audio components. The chroma components, the luminance components, and the audio components of the content item may be generated/extracted. Each component of the content item may include a respective plurality of portions that correspond to a plurality of portions of the other components of the content item. Each component of the content item may include and/or be associated with a timing element, and/or a plurality of timing elements, such as a timing element associated with each portion of the plurality of portions of the respective component of the content item. The timing element and/or the plurality of timing elements may be used to synchronize the components of the content item.

The chroma component of the content item may require more storage and bandwidth resources than the luminance and audio components. The chroma component may be stored in a computing device with a higher capacity storage (e.g., a central server, a cloud device, etc.). The computing device may have sufficient ability to process and store the chroma component. The luminance and audio components of the content item (e.g., video asset, multimedia asset, etc.) may require less storage and bandwidth resources than the chroma component. The luminance component and the audio components may be stored by another computing device (e.g., an edge device) with sufficient processing and storage capability to process and store the luminance and the audio components.

A user device (e.g., content player, set-top box, mobile device, digital video recorder, smart device, etc.) may request the content item. The computing device may send the chroma component to the user device and the edge device may send the luminance component and the audio component to the user device. The user device may receive a timing element and/or a plurality of timing elements included with and/or associated with each component of the content item, and use the timing element and/or the plurality of timing elements to assemble the chroma component, the luminance component, and the audio component to synchronize the content item and/or cause output of the content item. The separation of content items (e.g., video assets, multimedia assets, etc.) into respective chroma components, luminance components, and audio components to reduce storage and bandwidth requirements may also be used in video capture and security cases.

FIG. 1A shows a system 100 for managing content items. Those skilled in the art will appreciate that digital equipment and/or analog equipment may be employed. One skilled in the art will appreciate that provided herein is a functional description and that the respective functions may be performed by software, hardware, or a combination of software and hardware.

The system 100 may have a central location 101 (e.g., a headend), which may receive content (e.g., content items, etc.) from multiple sources. The central location 101 may combine the content from the various sources and may distribute the content to user (e.g., subscriber) locations (e.g., location 119) via a network 116.

The central location 101 may receive content from a variety of sources 102a, 102b, 102c. The content may be sent (e.g., transmitted) from the sources 102a, 102b, 102c to the central location 101 via a variety of transmission paths, such as wireless paths (e.g. satellite paths 103a, 103b) and terrestrial path 104. The central location 101 may also receive content from an input source 106 via a direct line 105 (e.g., one or more communication links and/or one or more communication paths). Other input sources may comprise capture devices, such as a video camera 109, a server 110, and/or the like. The content provided by the content sources may comprise a single content item, a portion of a content item (e.g., content fragment), a content stream, a multiplex that includes several content items, and/or the like.

The central location 101 may comprise one or a plurality of receivers 111a, 111b, 111c, 111d that are associated with one or more corresponding input sources. The central location 101 may comprise one or more encoders 112, switches 113, multiplexers, and/or the like. An encoder 112 may compress, encrypt, transform, and/or otherwise encode content. The encoder 112 may encode content based on one or more compression standards, such as MPEG. The encoder may receive content from the video camera 109 and/or other source and apply one or more encoding algorithms to the received content. A switch 113 may provide access to a server 110, which may be a Pay-Per-View server, a data server, an internet router, a network system, a phone system, and the like. Some signals may require processing, such as signal multiplexing, prior to being modulated. Such multiplexing may be performed by multiplexer 114.

The central location 101 may comprise one or more modulators 115 for interfacing with the network 116. The one or more modulators 115 may receive content from a receiver 111, encoder 112, multiplexer 114, and/or the like. The one or more modulators 115 may convert the received content into a modulated output signal suitable for transmission over the network 116. The one or more modulators 115 may map portions of the content to data bits expressed as signals (e.g., sinusoidal signals) at corresponding subcarrier frequencies of a data signal. The output signals from the modulators 115 may be combined, using equipment such as a combiner 117, for input into the network 116.

A control system 118 may permit a system operator to control and monitor the functions and performance of system 100. The control system 118 may interface, monitor, and/or control a variety of functions, including, but not limited to, a channel lineup for a television system, billing for each user, conditional access for content distributed to users, and the like. The control system 118 may provide input to the modulators for setting operating parameters, such as system specific MPEG table packet organization or conditional access information. The control system 118 may be located at the central location 101 or at a remote location.

The network 116 may be a content delivery network, a content access network, and/or the like. The network 116 may be configured to provide content from a variety of sources using a variety of network paths, protocols, devices, and/or the like. The content delivery network and/or content access network may be managed (e.g., deployed, serviced) by a content provider, a service provider, and/or the like. The network 116 may distribute content from the central location 101, a content source 127, and/or any other source to user locations, such as user location 119. The network 116 may be an optical fiber network, a coaxial cable network, a hybrid fiber-coaxial network, a wireless network, a satellite system, a direct broadcast system, or any combination thereof.

The system 100 may have one or more content sources 127. The content source 127 may be configured to provide content (e.g., content items, video assets, audio, games, applications, data) to a user device and/or user. The content source 127 may be configured to provide streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to provide the content via a packet switched network path, such as via an internet protocol (IP) based connection and/or the like. The content source 127 may be configured to provide the content via a non-packet switched network path, such as via a quadrature amplitude modulation (QAM) based connection, and/or the like. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The system 100 may have a security device 126. The security device 126 may be disposed at a user location (e.g., the user location 119, etc.) and/or a location associated with a user location. The system 100 may have one or more security devices 126. The security device 126 may be and/or include a camera (one or more cameras or related devices, etc.). The camera may be movable and/or able to pivot relative to any angle (e.g., a 360 degree range of motion, etc.). The security device 126 may be configured for automatic/still monitoring and/or video capture relative to a location and/or field of view. The security device 126 may operate in light and dark conditions. The security device 126 may focus visible and infrared light wavelengths onto a fixed focal plane. The security device 126 may include an infrared illumination source to illuminate a field of view during dark conditions. The security device 126 may capture and/or detect any motion or occurrence within a field of view.

The security device 126 may perform security analysis on a content item (e.g., video asset, multimedia asset, captured video, etc.). The security analysis may be performed on portions, parts, and/or versions of the content item, such as an analysis performed on a chroma component, a luminance component, and/or audio components of the content item. The security analysis may include facial recognition, item identification, motion detection, user review/analysis, color-based analysis (e.g., flame/fire detection, RGB color identification, identifying colors of person of interest's clothes, etc.), audio analysis (e.g., voice detection, sound and/or audio event identification, etc.), or any other type of analysis.

The network 116 may have a network component 129. The network component 129 may be any device, module, and/or the like communicatively coupled to the network 116. The network component 129 may be a router, a switch, a filter, a decomposer, a splitter, a packager, a gateway, a encoder, a storage device, a multiplexer, a network access location (e.g., tap), physical link, and/or the like. The network component 129 may manage content (e.g., content items, video assets, captured video, etc.), such as content received from one or more content sources 127, and/or one or more security devices (e.g., cameras, video capture systems, etc.). The network component 129 may manage the content to reduce storage (e.g., redundant storage) and bandwidth (e.g., upstream network capacity, downstream network capacity, etc.) requirements associated with access/storage of the content (e.g., content items, video assets, captured video, etc.).

The network component 129 may receive, request, retrieve, and store content (e.g., content items, video assets, multimedia assets, captured video, etc.), such as based on a request to receive and/or store (e.g., store based on a request from a digital video recorder, content player, etc.) the content. The network component 129 may receive, request, and/or retrieve content (e.g., content items, video assets, multimedia assets, captured video, etc.) from the content sources 127 and/or the security device 126. In some cases, the network component 129 may receive a request from the content source 127 (or a device associated with the content source 127) to store and/or process content (e.g., content items, video assets, multimedia assets, captured video, etc.). In some cases, the network component 129 may receive a request from the security device 126 (or a device associated with the security device 126) to store and/or process content (e.g., content items, video assets, multimedia assets, captured video, etc.). In some cases, the security device 126 and the network component 129 may be separate devices/systems. In some cases, the security device 126 and the network component 129 may be components (portions) of a single device/system.

A content item (e.g., video asset, multimedia asset, etc.) may include a chroma component, a luminance component, and one or more audio components. The content item may include a plurality of portions (e.g., frames, sections, data packets, etc.). Each portion of the plurality of portions may include a plurality of pixels, and each pixel of the plurality of pixels may include chroma components (e.g., chrominance information, color information, etc.), and luminance components (e.g., luma information, brightness information, etc.). Each portion of the plurality of portions may include audio components (e.g., acoustic information, language information, closed caption information, metadata, etc.).

The network component 129 may separate, decompose, and/or filter content (e.g., content items, video assets, multimedia assets, captured video, etc.), such as a content items received/retrieved from the content source 127 and/or the security device 126, to respective chroma, luminance, and audio components. The content item may include a plurality of portions (e.g., frames, sections, data packets, etc.). Each portion of the plurality of portions may include a plurality of pixels, and each pixel of the plurality of pixels may include a chroma component (e.g., chroma data, chrominance information, color information, etc.) and a luminance component (e.g., luminance data, luma information, brightness information, etc.). Each portion of the plurality of portions may include audio components (e.g., acoustic information, language information, closed caption information, metadata, etc.). The content item may be separated and/or filtered based on the chroma component, the luminance component, and audio components. In some cases, luminance components may be extracted from each pixel of the plurality of pixels and written/encoded to a luminance track file, chroma components may be extracted from each pixel of the plurality of pixels and written/encoded to a chroma track file. A corresponding audio track file may also be written/encoded. Each track file (e.g., luminance track file, chroma track file, audio track file, etc.) may be associated with an identifier, such as a packet identifier (PID) or any other identifier.

The network component 129 may separate, decompose, and/or filter a content item according to a variety of techniques. The network component 129 may function as a video decoder to separate, decompose, and/or filter a video-based content items to its components (e.g., chroma components, luminance components, audio components, etc.) via a low pass/high pass filter separation technique, or a color trap filter separation technique.

Figure 1B:
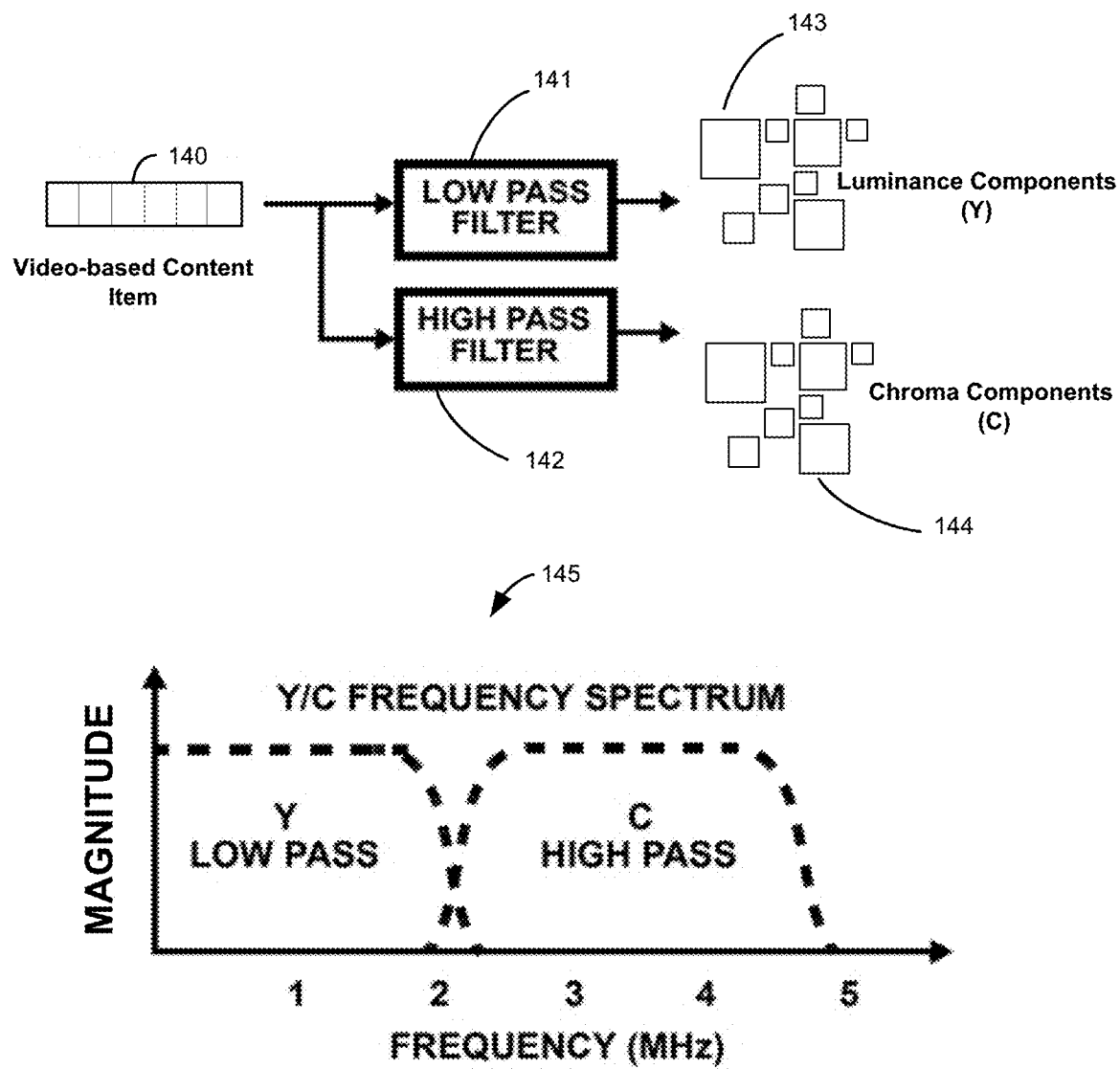
FIG. 1B shows a technique for determining components of a content item.

For example, a video-based content item may be separated, decomposed, and/or filtered to its components according to a low pass/high pass filter separation technique. To separate, decompose, and/or filter luminance components from the video-based content item, a low pass filter with a low frequency cutoff (e.g., range from 2 megahertz to 2.5 megahertz, etc.) may be used. A high pass filter with an increased band pass characteristic (e.g., range from 2.5 megahertz to 5 megahertz, etc.) may be used to pass (e.g., separate, filter, etc.) the chrominance components. A low pass/high pass filter separation technique may be effective because chroma components are generally centered around 3.5 megahertz and extends down to 2.5 megahertz. FIG. 1B shows video-based content item 140 being passed through a low pass filter 141 and a high pass filter 142. The low pass filter 141 may output luminance components 143 (Y). The high pass filter 142 may output chroma components 144 (C). Graph 145 is a frequency plot of a low pass/high pass filter separation technique.

Figure 1C:
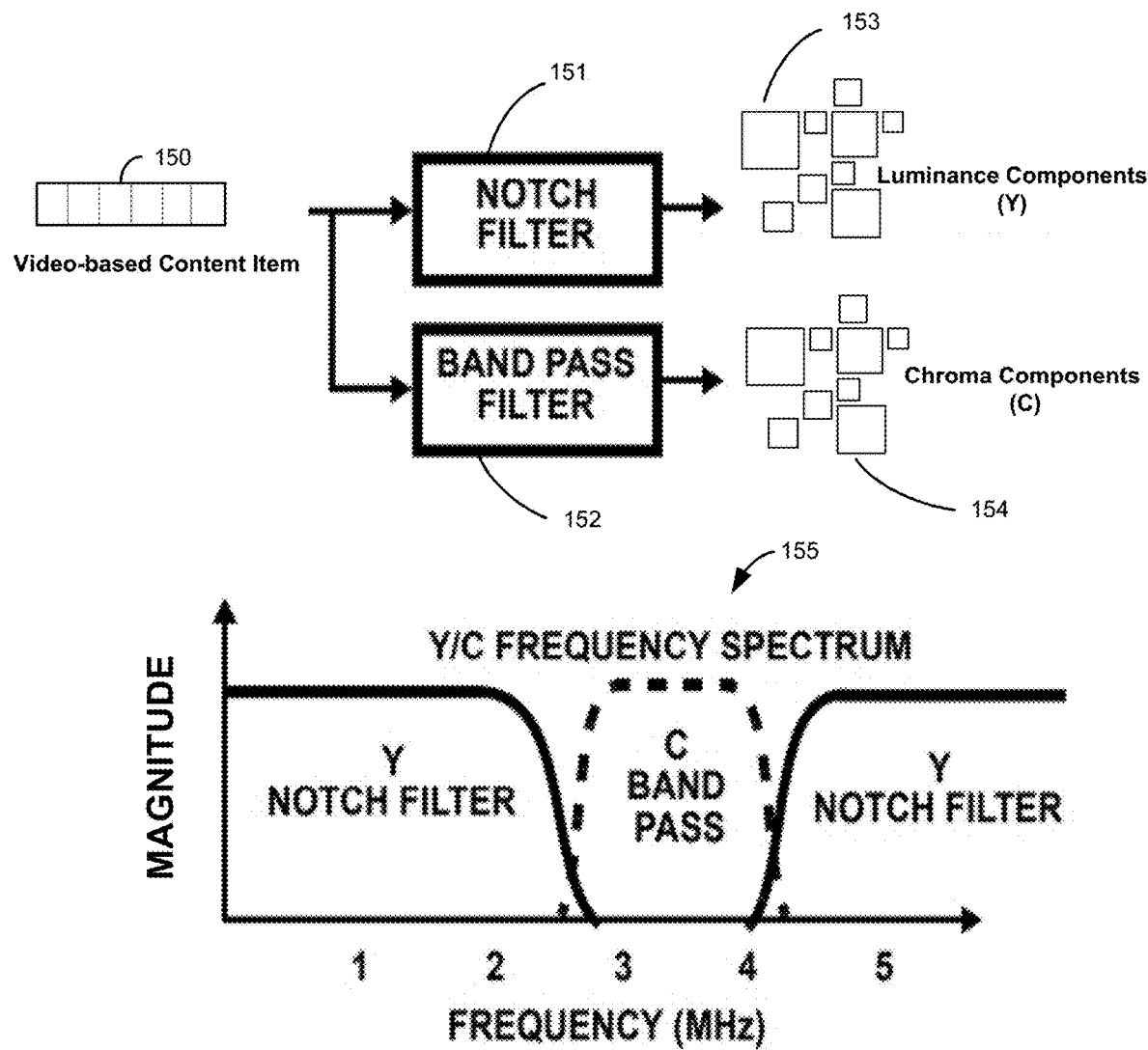
FIG. 1C shows a technique for determining components of a content item.

As another example, a video-based content item may be separated, decomposed, and/or filtered to its components according to a color trap filter separation technique. A notch filter centered at a color subcarrier frequency may be used to chroma components (C) within a frequency range, such as between 2.5 megahertz to 4.5 megahertz. FIG. 1C shows video-based content item 150 being passed through a notch filter 151 and a band pass filter 152. The notch filter 151 may output luminance components 153 (Y). The band pass filter 152 may output chroma components 154 (C). Graph 155 is a frequency plot of a color trap filter separation technique.

A video-based content item may be separated, decomposed, and/or filtered to its components according to any other technique, such as a comb filter separation technique, a chroma subsampling technique, and/or the like. Additionally, audio components may be may be separated, decomposed, and/or filtered from video-based content according to any technique, such as a video to audio conversion technique (e.g., MPEG-4 to MPEG-3 conversion, MP4 to MP3 conversion, etc.), an audio extraction technique, and/or the like.

The network component 129 may store, combine, and/or the like the chroma component as a chroma-only version (e.g., a video track, etc.) of the content item. The network component 129 may store, combine, and/or the like the luminance and audio components as a luminance-only, audio-only, and/or luminance and audio only versions (e.g., tracks, etc.) of the content item. The network component 129 may store, combine, and/or the like a version (e.g., a video track, an audio track, etc.) of the content item that includes any combination of the components (chroma, luminance, audio) of the content item.

Each version (e.g., video track, audio track, etc.) of the content item may include a respective plurality of portions that correspond to a plurality of portions of another version (e.g., video track, audio track, etc.) of the content item. Each version of the content item may include and/or be associated with a timing element, and/or a plurality of timing elements, such as a timing element associated with each portion of the plurality of portions of the respective version of the content item. The timing element and/or the plurality of timing elements may be used to synchronize the versions (e.g., video track, audio track, etc.) of the content item.

The chroma component (e.g., video track, etc.), associated with color portions of the content item, may represent a majority of data/information associated with the content item. The luminance component (e.g., video track, etc.), associated with achromatic portions of the content item (e.g., brightness of an image, black and white color of an image, etc.), and the audio components (e.g., audio track, etc.) which may be associated with acoustic portions, text portions, language portions, and/or the like of the content item may represent less data/information associated with the content item than the chroma component.

The chroma components may require more storage and bandwidth resources than the luminance and audio components. The network component 129 may send the chroma components to a computing device 130. The computing device 130 may be a device such as a central server, a cloud device, a remote storage, and/or the like. The computing device 130 may be configured as (or disposed at) a central location (e.g., a headend, processing facility, the central location 101, etc.). The computing device 130 may include a large storage and/or database. The computing device 130 may include sufficient ability (e.g., memory, storage capacity, data processors, etc.) to process and store the chroma component of the content item. The computing device 130 may receive, store, and process respective chroma components of a plurality of content items (e.g., video assets, multimedia assets, etc.).

The luminance and audio components may require less storage and bandwidth resources than the chroma component of the content item. The network component 129 may send the luminance and audio components to an edge device 128. The edge device 128 may be and/or include a router, a gateway device, a network device, an integrated access device (IAD), and/or the like. The edge device 128 may be one of a plurality of edge devices distributed across the network 116. The edge device 128 may be located in a region proximate to the user location 119. The edge device may include sufficient ability (e.g., memory, storage capacity, data processors, etc.) to process and store the luminance and audio components. In some cases, the edge device 128 and the network component 129 may be separate devices/systems. In some cases, the edge device 128 and the network component 129 may be components (portions) of a single device/system. The edge device 128 may cache or otherwise store the luminance and audio components to enable faster delivery of content items (e.g., video assets, multimedia assets, etc.) to user devices (e.g., a media device 120, a display 121, a communication terminal 122, a mobile device 124, etc.) and/or users (e.g., due to the location of the edge device 128 and/or network conditions). The edge device 128 may receive, store, and process respective luminance and audio components of a plurality of content items (e.g., video assets, multimedia assets, etc.).

In some instances, the network component 129 may send the chroma components to the edge device 128 and the luminance components and the audio components to the computing device 130. The edge device 128 may store and/or associate the chroma components with an identifier used to associate the chroma components with a content item. The computing device 130 may store and/or associate the luminance components and the audio components with identifiers used to associate the luminance components and the audio components with the content items. As described herein, chroma, luminance and audio components may be determined and stored according to any arrangement, scheme, or method.

A multitude of users may be connected to the network 116 via one or more user devices (e.g., the media device 120, the display 121, the communication terminal 122, the mobile device 124, etc.). At the user location 119, the media device 120 may synchronize, demodulate, and/or decode, if needed, the signals for display on a display device 121, such as on a television set (TV) or a computer monitor. The media device 120 may be and/or include a demodulator, decoder, frequency tuner, and/or the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may be a content player, a set-top box, a digital streaming device, a gaming device, a media storage device, a digital recording device, a computing device, a mobile computing device (e.g., a laptop, a smartphone, a tablet, etc.), a combination thereof, and/or the like. The media device 120 may implement one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. The communication terminal 122, for a cable network, may be configured to provide network access via a variety of communication protocols and standards, such as Data Over Cable Service Interface Specification (DOC SIS).

A first access point 123 (e.g., a wireless access point) may be located at the user location 119. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, the security device 126, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device, such as implemented as components of a single device.

The user location 119 is not necessarily fixed. A user may receive content and/or one or more content items (e.g., video assets, composite video, multimedia assets, etc.) from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park).

A user device (e.g., a content player, a set-top box, a mobile device, a digital video recorder, a smart device, the media device 120, the display 121, the communication terminal 122, the mobile device 124, etc.) may request the content item (e.g., video asset, multimedia asset, etc.). The request for the content item may be and/or include a request for playback of the content item. The request for the content item may be directed to the edge device 128 (e.g., due to the location of the edge device and/or network conditions). The user device, based on the request (e.g., a request for playback of the content item), may receive the chroma component of the content item from the computing device 130 and the luminance and audio components of the content item from the edge device 128. The user device, based on the request, may receive the timing element and/or the plurality of timing elements included with and/or associated with each component (chroma, luminance, audio) of the content item. The user device may use the timing element and/or the plurality of timing elements to synchronize the components of the content item and/or cause output of the content item. In some cases, an intermediate device (e.g., the network component 129, etc.), based on the request, may receive the timing element and/or the plurality of timing elements included with and/or associated with each component (chroma, luminance, audio) of the content item. The intermediate device may use the timing element and/or the plurality of timing elements to synchronize the components of the content item. The intermediate device may send the synchronized components to a user device. The user device may cause output of the content item (synchronized components).

Figure 2:
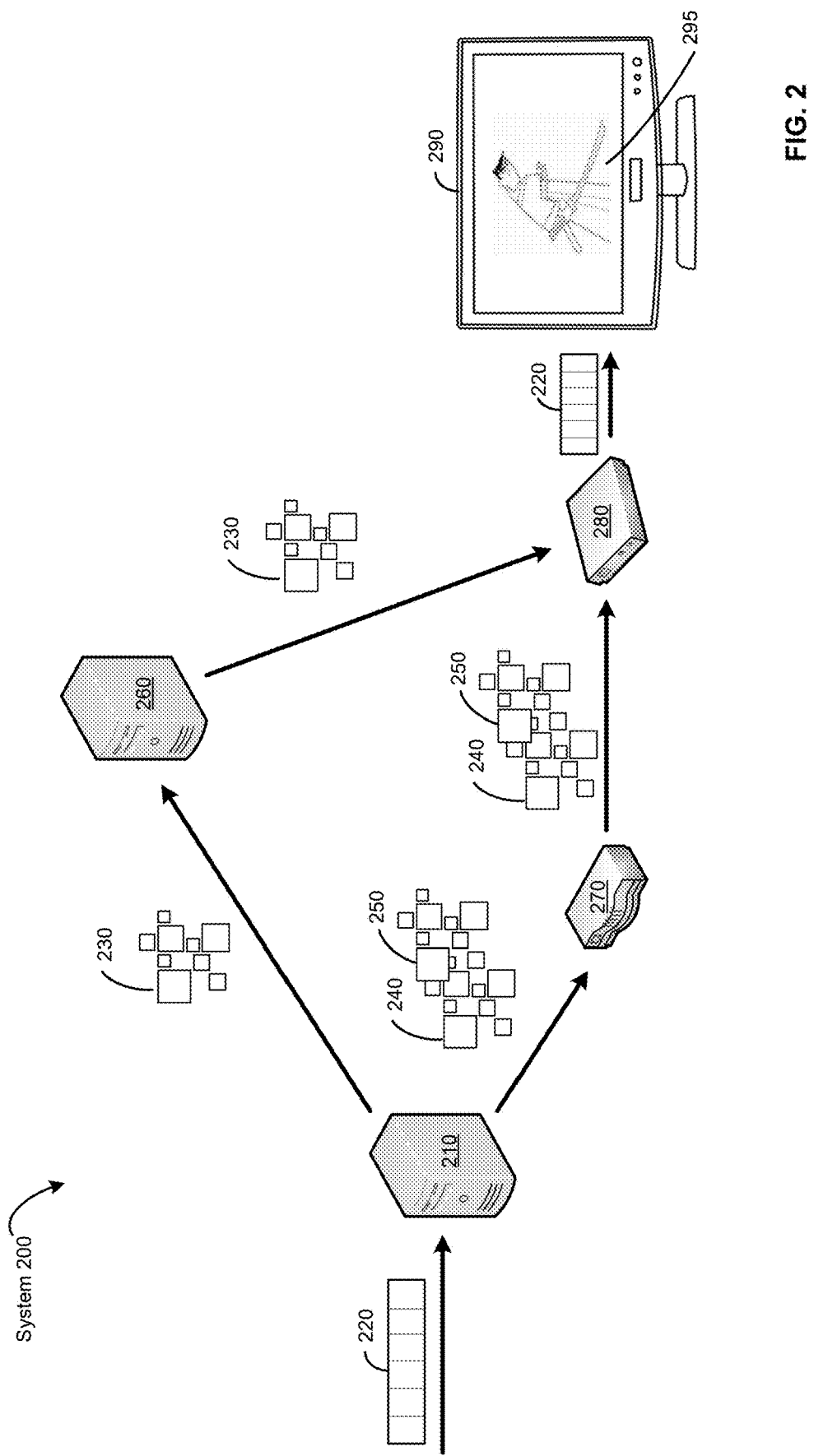
FIG. 2 shows a system for managing content items.

FIG. 2 shows a system 200 for managing content items. A network device 210 (e.g., the network component 129, etc.) may receive a content item 220. The content item 220 may be a video asset, such as a movie, program, captured video, and/or the like. The network device 210 may receive the content item from any source (not shown), such as a content provider (e.g., the content source 127, etc.), a subscription service, a security system (e.g., the security device 126, etc.), and/or any other source.

To reduce storage and bandwidth requirements associated with access/storage of content items (e.g., reduce occurrences of data/information stored redundantly on multiple devices, etc.), such as the content item 220, the network device 210 may separate, decompose, and/or filter the content item 220 to its components such as a chroma component 230, a luminance component 240, and an audio component 250.

The chroma component 230 may require more storage and bandwidth resources than the luminance component 240 and/or the audio component 250. To accommodate the increased storage and bandwidth requirements of the chroma component 230, the network device 210 may send the chroma component 230 to a computing device 260 (e.g., a central server, a cloud device, the computing device 130, etc.). The computing device 260 may store the chroma component 230 (store a video track that includes the chroma component 230, etc.) The computing device 260 may store the chroma component 230 along with an identifier (e.g., a packet identifier (PID), a content/component identifier, etc.) of the chroma component 230. The identifier (e.g., a packet identifier (PID), a content/component identifier, etc.) of the chroma component 230 may be used to associate the chroma component 230 with the content item 220. The computing device 260 may include sufficient ability (e.g., memory, storage capacity, data processors, etc.) to process and store the chroma component 230.

The luminance component 240 and the audio component 250 may require less storage and bandwidth resources than the chroma component 230. The network device 210 may send the luminance component 240 and the audio component 250 to an edge device 270 (e.g., a network device, a router, a gateway device, an integrated access device (IAD), a computing device, the edge device 128, etc.). The edge device 270 may store the luminance component 240 along with an identifier (e.g., a packet identifier (PID), a content/component identifier, etc.) of the luminance component 240, and the audio component 250 along with an identifier (e.g., a packet identifier (PID), a content/component identifier, etc.) of the audio component 250. The respective identifiers (e.g., packet identifiers (PIDs), content/component identifiers, etc.) of the luminance component 240 and the audio component 250 may be used to associate the luminance component 240 and the audio component 250 with the content item 220. The edge device 270 may cache and/or otherwise store the luminance component 240 and the audio component 250 (store a video track that includes the luminance component 240 and an audio track that includes the audio component 250, etc.) to enable faster delivery of the content items 220 to a user device 280 (e.g., a content player, a set-top box, a digital streaming device, the media device 120, etc.).

The chroma component 230, the luminance component 240, and the audio component 250 may each include a respective plurality of portions that correspond to a plurality of portions of the other components of the content item 220. The chroma component 230, the luminance component 240, and the audio component 250 may each include and/or be associated with a timing element, and/or a plurality of timing elements, such as a timing element associated with each portion of the plurality of portions of the respective component of the content item 220. The timing element and/or the plurality of timing elements may be used to synchronize the chroma component 230, the luminance component 240, and the audio component 250. Timing elements may include time stamps of packets (PTS), watermarks, metadata, and/or the like.

The user device 280 may request the content item 220 (e.g., request playback of the content item 220, etc.). The request for the content item 220 may include an identifier of the content item 220. Based on the request for the content item 220, the computing device 260 may send the chroma component 230 (and respective timing element and/or one or more timing elements) to the user device 280, and the edge device 270 may send the luminance component 240 (and respective timing element and/or one or more timing elements) and the audio component 250 (and respective timing element and/or one or more timing elements) to the user device 280. In some cases, computing device 260 may match the identifier of the content item 220 to an identifier (e.g., a packet identifier (PID), a content/component identifier, etc.) of the chroma component 230 and send the chroma component 230 (and respective timing element and/or one or more timing elements) to the user device 280 based on the match. In some cases, the edge device 270 may match the identifier of the content item 220 to respective identifiers (e.g., packet identifiers (PIDs), content/component identifiers, etc.) of the luminance component 240 and the audio component 250 and send the luminance component 240 and the audio component 250 (and respective timing elements and/or one or more timing elements) to the user device 280 based on the match.

The user device 280 may use one or more timing elements (the respective timing element and/or one or more timing elements of the components of the content item 220) to synchronize the chroma component 230, the luminance component 240, and the audio component 250. The user device 280 may cause a display 290 (e.g., the display 121, etc.) to output (e.g., playback) a synchronized content item 295 that corresponds to the content item 220.

In some instances, the network device 210 may send the chroma component 230 to the edge device 270 and the luminance component 240 and the audio component 250 to the computing device 260. The edge device 270 may store and/or associate the chroma component 230 with an identifier used to associate the chroma component 230 with the content item 220. The computing device 260 may store and/or associate the luminance component 240 and the audio component 250 with identifiers used to associate the luminance component 240 and the audio component 250 with the content item 220. As described herein, chroma, luminance and audio components may be determined and stored according to any arrangement, scheme, or method.

FIG. 3 shows a flowchart of a method 300 for managing content items. At 310, a request to store a content item (e.g., video asset, multimedia asset, etc.) may be received. A network device (e.g., the network component 129, etc.) may receive the request to store the content item. The request to store the content item may originate from a content source (e.g., the content source 127, etc.), a device (e.g., the security device 126, etc.), and/or the like. The request to store the content item may be based on a request for the content item (e.g., a request to store and/or access the content item) from a user device (e.g., content player, set-top box, mobile device, digital video recorder, smart device, etc.), such as request to record/access the content item. A user device (e.g., content player, set-top box, mobile device, digital video recorder, smart device, etc.) may request to record (e.g., store, etc.) a movie, a show, a sport event, and/or the like.

At 320, components of the content item (e.g., video asset, multimedia asset, etc.) may be determined. In some cases, components of the movie, the show, the sport event, and/or the like requested by the user device may be determined. The network device (e.g., the network component 129, etc.) may determine the components of the content item. To reduce storage and bandwidth requirements associated with access/storage of the content item, the content item may be separated, decomposed, and/or filtered into components, such as a chroma component, a luminance component, and audio components, that are stored and/or maintained by a device and/or devices suited for storing and/or maintaining each respective component of the content item.

The content item (e.g., video asset, multimedia asset, etc.) may include a plurality of portions (e.g., frames, sections, data packets, etc.). In some cases, the movie, the show, the sport event, and/or the like requested by the user device may include a plurality of frames, sections, and/or the like. Each portion of the plurality of portions may include a plurality of pixels, and each pixel of the plurality of pixels may include chroma components (e.g., chrominance information, color information, etc.), and luminance components (e.g., luma information, brightness information, etc.). Each portion of the plurality of portions may also include audio components (e.g., acoustic information, language information, closed caption information, metadata, etc.). The network device (e.g., the network component 129, etc.) may determine the components (chroma, luminance, audio) of the content item according to a variety of techniques, such as a low pass/high pass filter separation technique, a color trap filter separation technique, a comb filter separation technique, a chroma subsampling technique, and/or any other component separation technique.

A timing element, and/or a plurality of timing elements, such as a timing element associated with each portion of the plurality of portions of the content item (e.g., video asset, multimedia asset, etc.) may be determined. In some cases, the movie, the show, the sport event, and/or the like requested by the user device may include a timing element and/or a plurality of timing elements associated with each frame, section, and/or the like of the movie, the show, the sport event, and/or the like. The timing element and/or the plurality of timing elements may be used to synchronize the chroma, the luminance, and the audio components of the content item. In some cases, the network device may generate a video track of the content item that includes the chroma component and excludes the luminance and audio components. The network device may generate another video track of the content item that includes the luminance and audio components, and excludes the chroma component.

At 330, the chroma component of the content item (e.g., video asset, multimedia asset, etc.) may be stored. In some cases, the chroma component of the movie, the show, the sport event, and/or the like requested by the user device may be stored. The network device (or any other device) may cause the chroma components, such as the video track that includes the chroma components, to be stored. The chroma component associated with color portions of the content item, may represent a majority of data/information associated with the content item. The chroma component may require more storage and bandwidth resources than the luminance and audio components. To reduce storage and bandwidth requirements associated with access/storage of the content item (e.g., reduce occurrences of data/information stored redundantly on multiple devices, etc.), the network device may send (and/or cause to be sent) the chroma component of the content item to a first computing device (e.g., the computing device 130, etc.).

The first computing device may be a device such as a central server, a cloud device, a remote storage, and/or the like. The first computing device may be and/or may be configured with a large storage and/or database. The first computing device may include sufficient ability (e.g., memory, storage capacity, data processors, etc.) to process and store the chroma component. In some cases, the first computing device may receive, store, and process respective chroma components of a plurality of content items (e.g., video assets, multimedia assets, etc.) from a plurality of sources (e.g., the content source 127, the security device 126, etc.).

At 340, the luminance and audio components may be stored. In some cases, the luminance and audio components of the movie, the show, the sport event, and/or the like requested by the user device may be stored. The network device (or any other device) may cause the luminance and audio components, such as the video track (one or more video tracks) that includes the luminance and audio components, to be stored. The luminance component, associated with achromatic portions of the content item (e.g., brightness of an image, black and white color of an image, etc.), and the audio components which may be associated with acoustic portions, text portions, language portions, and/or the like of the content item (e.g., video asset, multimedia asset, etc.) may represent less data/information associated with the content item than the chroma component. To reduce storage and bandwidth requirements associated with access/storage of the content item (e.g., reduce occurrences of data/information stored redundantly on multiple devices, etc.), the network device may send (and/or cause to be sent) the luminance and audio components to a second computing device (e.g., the edge device 128, etc.).

The second computing device may be a device such as a router, a gateway device, an integrated access device (IAD), a computing device, and/or the like. The second computing device may be located proximate to a user device (e.g., content player, set-top box, mobile device, digital video recorder, smart device, etc.) and/or user location. The second computing device may include sufficient ability (e.g., memory, storage capacity, data processors, etc.) to process and store the luminance and audio components of the content item (e.g., video asset, multimedia asset, etc.). In some cases, the second computing device may receive, store, and process respective luminance and audio components of a plurality of content items (e.g., video assets, multimedia assets, etc.) from a plurality of sources (e.g., the content source 127, the security device 126, etc.).

The chroma, luminance, and the audio components of the content item (e.g., video asset, multimedia asset, etc.) may be synchronized by a user device (e.g., content player, set-top box, mobile device, digital video recorder, smart device, etc.). In some cases, chroma, luminance, and the audio components of the movie, the show, the sport event, and/or the like requested by the user device may be synchronized. The user device may request the content item and based on the request, may receive the chroma component (a video track comprising the chroma component), from the first computing device and the luminance and audio components (a video track comprising the luminance and audio components, or a video track comprising the luminance component and a video track comprising the audio components) from the second computing device. The user device may also receive the timing element and/or the plurality of timing elements associated with the content item from the first computing device, the second computing device, or any other device. The user device may use the timing element and/or the plurality of timing elements to synchronize the chroma, luminance, and the audio components of the content item. The user device may cause an output of the synchronized (composite) content item.

FIG. 4 shows a flowchart of a method 400 for managing content items. At 410, a user device (e.g., content player, set-top box, mobile device, digital video recorder, smart device, etc.) may request a content item (e.g., video asset, multimedia asset, etc.), such as playback of a movie, program, video, and/or the like. To reduce storage and bandwidth requirements associated with playback of the content item, the content item may be separated, decomposed, and/or filtered into components, such as chroma, luminance, and audio components, that are stored and/or maintained by a device and/or devices suited for storing and/or maintaining each respective component prior to (or substantially current with, such as in real-time) the request for the content item.

The content item may include a plurality of portions (e.g., frames, sections, data packets, etc.) and each portion of the plurality of portions may include a plurality of pixels. Each pixel of the plurality of pixels may include chroma components (e.g., chrominance information, color information, etc.), and luminance components (e.g., luma information, brightness information, etc.). Each portion of the plurality of portions may also include audio components (e.g., acoustic information, language information, closed caption information, metadata, etc.). In some cases, luminance components may be extracted from each pixel of the plurality of pixels and written/encoded to a luminance track file, chroma components may be extracted from each pixel of the plurality of pixels and written/encoded to a chroma track file. A corresponding audio track file may also be written/encoded. Each track file (e.g., luminance track file, chroma track file, audio track file, etc.) may be associated with an identifier, such as a packet identifier (PID) or any other identifier.

Components of the content item may be determined (e.g., by a device such as the network component 129, etc.) according to a variety of techniques, such as a low pass/high pass filter separation technique, a color trap filter separation technique, a comb filter separation technique, a chroma subsampling technique, and/or any other component separation technique.

A timing element, and/or a plurality of timing elements associated with the content item may be determined to enable the components (chroma, luminance, audio, etc.) of the content item to be recomposed and/or combined. The timing element and/or the plurality of timing elements may be used to synchronize the chroma, luminance, and audio components of the content item. A video track of the content item that includes the chroma component and excludes the luminance and audio components may be generated prior to (or substantially concurrent with, in real-time, etc.) the request for the content item. A video track of the content item that includes the luminance and audio components, and excludes the chroma component may also be generated prior to (or substantially concurrent with, in real-time, etc.) the request for the content item.

The chroma component, such as the video track that includes the chroma component, may be associated with color portions of the content item and represent a majority of data/information associated with the content item. The chroma component may require more storage and bandwidth resources than the luminance and audio components of the content item. To reduce storage and bandwidth requirements associated with access/storage of the content item (e.g., reduce occurrences of data/information stored redundantly on multiple devices, etc.), the chroma component may be stored by a first computing device (e.g., the computing device 130, a central server, etc.). The first computing device may be a device such as a central server, a cloud device, a remote storage, and/or the like. The first computing device may be and/or may be configured with a large storage and/or database. The first computing device may include sufficient ability (e.g., memory, storage capacity, data processors, etc.) to process and store the chroma components. In some cases, the first computing device may receive, store, and process respective chroma components of a plurality of content items (e.g., video assets, multimedia assets, etc.) from a plurality of sources (e.g., the content source 127, etc.).

The luminance and audio components, such as the video track (one or more video tracks) that includes the luminance and audio components, may be associated with achromatic portions (e.g., brightness of an image, black and white color of an image, etc.), acoustic portions, text (closed captioning) portions, language portions, and/or the like of the content item. The luminance and audio components may represent less data/information associated with the content item than the chroma component. To reduce storage and bandwidth requirements associated with access/storage of the content item (e.g., reduce occurrences of data/information stored redundantly on multiple devices, etc.), the luminance and audio components may be stored by a second computing device (e.g., the edge device 128, a network edge device, etc.). The second computing device may be a device such as a router, a gateway device, an integrated access device (IAD), a computing device, and/or the like. The second computing device may be located proximate to the user device (e.g., content player, set-top box, mobile device, digital video recorder, smart device, etc.). The second computing device may include sufficient ability (e.g., memory, storage capacity, data processors, etc.) to process and store the luminance and audio components. In some cases, the second computing device may receive, store, and process respective luminance and audio components of a plurality of content items (e.g., video assets, multimedia assets, etc.) from a plurality of sources (e.g., the content source 127, security device 126, etc.).

At 420, the user device may receive the chroma component, such as the video track that includes the chroma component, from the first computing device. At 430, the user device may receive the luminance and audio components, such as the video track that includes the luminance and audio components, from the second computing device.

At 440, the chroma, luminance, and the audio components may be synchronized. The user device may, based on the request for the content item, receive the timing element, and/or the plurality of timing elements associated with the content item. The user device may receive the timing element, and/or the plurality of timing elements from the first computing device, the second computing device, and/or any device. The user device may use the timing element and/or the plurality of timing elements to synchronize the chroma, luminance, and the audio components (e.g., synchronize the video tracks, etc.) of the content item.

At 450, the user device may cause an output of the synchronized content item (e.g., the synchronized video tracks, etc.). The user device may cause a device (e.g., the display 121, the mobile device 124, the communication terminal 122, etc.) to display, record, access and/or the like the synchronized content item.

FIG. 5 shows a flowchart of a method 500 for managing content items. At 510, components of video content (e.g., captured video, a video asset, a multimedia asset, etc.) may be determined. A security device (e.g., the security device 126, a security system video capture device, etc.) may receive, capture, and/or generate the video content via one or more cameras associated with the security device. In some cases, a security camera in a store or location may capture video (e.g., a content item) within its field of view. The security device (e.g., the security device 126, etc.) may determine the components of the video content according to a variety of techniques, such as a low pass/high pass filter separation technique, a color trap filter separation technique, a comb filter separation technique, a chroma subsampling technique, and/or any other component separation technique.

The security device may determine a timing element, and/or a plurality of timing elements associated with the video content to enable the components (chroma, luminance, audio, etc.) of the video content to be recomposed and/or combined. The timing element and/or the plurality of timing elements may be used to synchronize the chroma, luminance, and audio components of the video content. A video track of the video content that includes the chroma and audio components may be generated when (e.g., substantially concurrent with, in real-time, etc.) the video content is captured, generated, and/or determined. A video track of the video content that includes the luminance components, and excludes the chroma and audio components may also be generated when (e.g., substantially concurrent with, in real-time, etc.) the video content is captured, generated, and/or determined. In some cases, luminance components may be extracted from each pixel of the video track and written/encoded to a luminance track, chroma components may be extracted from each pixel of video track and written/encoded to a chroma track. A corresponding audio track may also be written/encoded. Each track (e.g., luminance track, chroma track, audio track, etc.) may be associated with an identifier, such as a packet identifier (PID) or any other identifier.

At 520, the chroma and audio components may be stored. The security device may store the chroma and audio components. In some cases, the security camera in the store or the location may store chroma and audio components of the video (e.g., the content item) captured within its field of view. The security device may include sufficient ability (e.g., memory, storage capacity, data processors, etc.) to process and store the chroma and audio components. In some cases, the security device may receive, store, and process respective chroma and audio components of a plurality of video content items.

At 530, the luminance component (e.g., the luminance track, etc.) may be sent to a computing device (e.g., the computing device 130, a central server, etc.). The security device may send the luminance component of the video content to the computing device and the computing device may perform a security analysis on the luminance component. In some cases, the security camera in the store or the location may send the luminance components of the video (e.g., the content item) captured within its field of view to a cloud-based device (e.g., server) for security analysis. The security analysis may include facial recognition, item identification, motion detection, user review/analysis, and/or the like.

At 540, the chroma and audio components (e.g., the chroma and audio tracks, etc.) may be sent to a computing device (e.g., the computing device 130, a central server, etc.). Based on the security analysis, the computing device may request and/or the security device may send the chroma and audio components to the computing device. In some cases, based on the security analysis by the cloud-based device (e.g., server), the security camera in the store or the location may send the chroma and audio components of the video (e.g., the content item) captured within its field of view to the cloud-based device (e.g., server) for additional security analysis. The computing device may perform, based on the chroma and audio components, further analysis of the video content, such as color-based analysis, audio analysis, and/or the like. Network bandwidth and storage resources may be preserved by sending the chroma and audio components to the computing device only as required for analysis.

FIG. 6 shows a system 600 for managing content items. The server 110, the security device 126, the content source 127, the edge device 128, the network component 129, the media device 120, the display 121, the communication terminal 122, the mobile device 124 of FIG. 1A (or any other device described herein) may be a computer 601 as shown in FIG. 6.

The computer 601 may comprise one or more processors 603, a system memory 612, and a bus 613 that couples various components of the computer 601 including the one or more processors 603 to the system memory 612. In the case of multiple processors 603, the computer 601 may utilize parallel computing.

The bus 613 may comprise one or more of several possible types of bus structures, such as a memory bus, memory controller, a peripheral bus, an accelerated graphics port, and a processor or local bus using any of a variety of bus architectures.

The computer 601 may operate on and/or comprise a variety of computer readable media (e.g., non-transitory). Computer readable media may be any available media that is accessible by the computer 601 and comprises, non-transitory, volatile and/or non-volatile media, removable and non-removable media. The system memory 612 has computer readable media in the form of volatile memory, such as random access memory (RAM), and/or non-volatile memory, such as read only memory (ROM). The system memory 612 may store data such as component data 607 and/or program modules such as operating system 605 and component separation software 606 that are accessible to and/or are operated on by the one or more processors 603.

The computer 601 may also comprise other removable/non-removable, volatile/non-volatile computer storage media. The mass storage device 604 may provide non-volatile storage of computer code, computer readable instructions, data structures, program modules, and other data for the computer 601. The mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 604. An operating system 605 and component separation software 606 may be stored on the mass storage device 604. One or more of the operating system 605 and component separation software 606 (or some combination thereof) may comprise program modules and the component separation software 606. Component data 607 may also be stored on the mass storage device 604. Component data 607 may be stored in any of one or more databases known in the art. The databases may be centralized or distributed across multiple locations within the network 615.

A user may enter commands and information into the computer 601 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices may be connected to the one or more processors 603 via a human machine interface 602 that is coupled to the bus 613, but may be connected by other interface and bus structures, such as a parallel port, game port, an IEEE 1394 Port (also known as a Firewire port), a serial port, network adapter 608, and/or a universal serial bus (USB).

A display device 611 may also be connected to the bus 613 via an interface, such as a display adapter 609. It is contemplated that the computer 601 may have more than one display adapter 609 and the computer 601 may have more than one display device 611. A display device 611 may be a monitor, an LCD (Liquid Crystal Display), light emitting diode (LED) display, television, smart lens, smart glass, and/or a projector. Other output peripheral devices may comprise components such as speakers (not shown) and a printer (not shown) which may be connected to the computer 601 via Input/Output Interface 610. Any step and/or result of the methods may be output (or caused to be output) in any form to an output device. Such output may be any form of visual representation, including, but not limited to, textual, graphical, animation, audio, tactile, and the like. The display 611 and computer 601 may be part of one device, or separate devices.

The computer 601 may operate in a networked environment using logical connections to one or more remote computing devices 614a,b,c. A remote computing device 614a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 601 and a remote computing device 614a,b,c may be made via a network 615, such as a local area network (LAN) and/or a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components may reside at various times in different storage components of the computing device 601, and are executed by the one or more processors 603 of the computer 601. An implementation of component separation software 606 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   receiving a request to store a content item;
   determining a chroma component, a luminance component, and an audio component of the content item;
   causing a first computing device to store the chroma component, wherein the chroma component comprises a chroma track of the content item, and wherein the chroma track comprises a plurality of packets containing chroma data for one or more pixels of the content item; and
   causing a second computing device to store the luminance component and the audio component.

2. The method of claim 1, further comprising:
   receiving, from a content player, a request for playback of the content item;
   causing, based on the request, the chroma component to be sent to the content player from the first computing device; and
   causing, based on the request, the luminance component and the audio component to be sent to the content player from the second computing device.

3. The method of claim 2, further comprising causing one or more timing elements to be sent to the content player, wherein the one or more timing elements cause the content player to synchronize the chroma component, the luminance component, and the audio component.

4. The method of claim 1, wherein the second computing device comprises at least one of: a set-top-box (STB), a router, a gateway, an access point, an integrated access device (IAD), a content player, a media device, a mobile device, or a digital video recorder (DVR), and wherein the second computing device is separate from a central device.

5. The method of claim 1, wherein storing the luminance component and the audio component comprises causing an edge device to store a luminance track and an audio track of the content item, wherein the luminance track comprises a plurality of data packets containing luminance data for the one or more pixels of the content item.

6. The method of claim 1, further comprising filtering, from the content item, the chroma component, the luminance component, and the audio component of the content item.

7. A method comprising:
   receiving, from a first computing device, a chroma track of a content item, wherein the chroma track comprises a plurality of packets containing chroma data for one or more pixels of the content item;
   receiving from a second computing device, a luminance track of the content item and an audio track of the content item, wherein the second computing device is separate from the first computing device; and
   synchronizing the chroma track, the luminance track, and the audio track.

8. The method of claim 7, further comprising reconstituting the chroma track and reconstituting the luminance track, wherein reconstituting the chroma track and reconstituting the luminance track comprises synchronizing the chroma track and the luminance track.

9. The method of claim 8, further comprising sending, to a user device, the reconstituted chroma track and the reconstituted luminance track.

10. The method of claim 8, further comprising causing output of the reconstituted chroma track and the reconstituted luminance track.

11. The method of claim 7, wherein the first computing device comprises a content source and wherein the second computing device comprises an edge device.

12. The method of claim 7, further comprising:
    receiving one or more timing elements associated with the content item; and
    synchronizing, based on the one or more timing elements, the luminance track, the chroma track, and the audio track.

13. A system comprising:
    a first computing device configured to:
      receive a request to store a content item;
      determine a chroma component, a luminance component, and an audio component of the content item;
      store the chroma component wherein the chroma component comprises a chroma track of the content item, and wherein the chroma track comprises a plurality of packets containing chroma data for one or more pixels of the content item;
      cause a second computing device to store the luminance component and the audio component; and
    the second computing device configured to output the luminance component.

14. The system of claim 13, wherein the first computing device is further configured to:
    receive, from a content player, a request for playback of the content item;
    cause, based on the request, the chroma component to be sent to the content player; and
    cause, based on the request, the luminance component and the audio component to be sent to the content player from the second computing device.

15. The system of claim 13, wherein the first computing device is further configured to cause one or more timing elements to be sent to a content player, wherein the one or more timing elements cause the content player to synchronize the chroma component, the luminance component, and the audio component.

16. The system of claim 13, wherein the second computing device comprises at least one of: a set-top-box (STB), a router, a gateway, an access point, an integrated access device (IAD), a content player, a media device, a mobile device, or a digital video recorder (DVR).

17. One or more non-transitory computer-readable media storing processor-executable instructions thereon that, when executed by a processor, cause the processor to:
   receive a request to store a content item;
   determine a chroma component, a luminance component, and an audio component of the content item;
   cause a first computing device to store the chroma component wherein the chroma component comprises a chroma track of the content item, and wherein the chroma track comprises a plurality of packets containing chroma data for one or more pixels of the content item; and
   cause a second computing device to store the luminance component and the audio component.

18. The one or more non-transitory computer-readable media of claim 17, wherein the processor-executable instructions further cause the processor to:
   receive, from a content player, a request for playback of the content item;
   cause, based on the request, the chroma component to be sent to the content player from the first computing device; and
   cause, based on the request, the luminance component and the audio component to be sent to the content player from the second computing device.

19. The one or more non-transitory computer-readable media of claim 17, wherein the processor-executable instructions further cause the processor to cause one or more timing elements to be sent to a content player, wherein the one or more timing elements cause the content player to synchronize the chroma component, the luminance component, and the audio component.

20. The one or more non-transitory computer-readable media of claim 17, wherein the second computing device comprises at least one of: a set-top-box (STB), a router, a gateway, an access point, an integrated access device (IAD), a content player, a media device, a mobile device, or a digital video recorder (DVR).

* * * * *